US008607357B2

(12) United States Patent
    Dewa

(10) Patent No.: US 8,607,357 B2
(45) Date of Patent: Dec. 10, 2013

(54) RECEIVING APPARATUS, RECEIVING METHOD, TRANSMITTING APPARATUS, TRANSMITTING METHOD, AND MEDIUM

(75) Inventor: Yoshiharu Dewa, Tokyo (JP)

(73) Assignee: Sony Corporation, Tokyo (JP)

(*) Notice: Subject to any disclaimer, the term of this patent is extended or adjusted under 35 U.S.C. 154(b) by 903 days.

(21) Appl. No.: 12/204,681

(22) Filed: Sep. 4, 2008

(65) Prior Publication Data

US 2009/0070540 A1    Mar. 12, 2009

(30) Foreign Application Priority Data

Sep. 6, 2007  (JP) ................. 2007-231129

(51) Int. Cl.
    *H04L 29/06*  (2006.01)
    *G06F 21/00*  (2013.01)

(52) U.S. Cl.
    USPC .......................................... 726/27; 713/187

(58) Field of Classification Search
    None
    See application file for complete search history.

(56) References Cited

U.S. PATENT DOCUMENTS

| 2003/0004884 A1* | 1/2003 | Kitazato ................. 705/51 |
| 2003/0023725 A1 | 1/2003 | Bradfield et al. |
| 2005/0004978 A1* | 1/2005 | Reed et al. ............... 709/203 |
| 2007/0140270 A1 | 6/2007 | Hulkkonen |
| 2007/0186245 A1 | 8/2007 | Ryu |
| 2007/0189535 A1 | 8/2007 | Lee et al. |

FOREIGN PATENT DOCUMENTS

| EP | 1 764 974 | 3/2007 |
| JP | 2002-007347 | 1/2002 |
| JP | 2004-312595 | 11/2004 |
| WO | WO 2005/122577 | 12/2005 |

OTHER PUBLICATIONS

European Search Report dated Dec. 22, 2009, for European Patent Application No. 09013503.9 (5 pages).
European Search Report dated Feb. 6, 2009 for European Patent Application No. 08252722.7 (4 pages).
Open Mobile Alliance: Mobile Broadcast Services Architecture, Draft Version 1.0, Apr. 20, 2005 (88 pages).
European Search Report and Opinion dated Jun. 1, 2011, for European Patent Application No. 11159644.1-2413 (6 pages).
Office Action dated Apr. 24, 2012 for corresponding Japanese Patent Application No. 2007-231129. (3 pgs).
International Search Report dated Sep. 27, 2005 for corresponding International Application No. PCT/JP2005/010716. (2 pgs).

* cited by examiner

*Primary Examiner* — Gilberto Barron, Jr.
*Assistant Examiner* — Malcolm Cribbs
(74) *Attorney, Agent, or Firm* — Sherr & Jiang, PLLC

(57) ABSTRACT

A receiving apparatus has a first memory area accessible by a first provider providing first contents and a second memory area accessible by a second provider providing second contents. A receiving unit receives a first access right file and a second access right file. An output unit outputs the first contents or the second contents. A memory control unit stores first information associated with the first contents in the first memory area and stores second information associated with the second contents in the second memory area. A switching unit switches from outputting the first contents to outputting the second contents. A determining unit determines whether the second provider is permitted to access the first memory area. An output controller reads the first information and outputs the second contents based on the first information to the output unit when the second provider is permitted to access the first memory area.

7 Claims, 9 Drawing Sheets

FIG. 7

Permission Request File

```
<?xml version="1.0"?>
<permissionrequestfile orgid="0x00002134" appid="0x4010">
<persistentfilecredential>
<grantoridentifier id="0x01"></grantoridentifier>
<expirationdate date="24/12/2032"></expirationdate>
<filename read="true" write="false">5/15/dir1/scores</filename>
<filename read="true" write="false">5/15/dir1/names</filename>
<signature>HX9voMN0PVC+UsFqCBa+usMJ/kE=</signature>
<certchainfileid>02a4000001</certchainfileid>
</persistentfilecredential>
</permissionrequestfile>
```

RECEIVING APPARATUS, RECEIVING METHOD, TRANSMITTING APPARATUS, TRANSMITTING METHOD, AND MEDIUM

RELATED APPLICATION

This application is based upon and claims the benefit of priority to Japanese Patent Application No. 2007-231129, filed on Sep. 6, 2007, the entire contents of which are incorporated herein by reference.

BACKGROUND

1. Technical Field

The present invention relates to a receiving apparatus, a receiving method, a transmitting apparatus, a transmitting method, and a program, which can allow data to be mutually used.

2. Description of the Related Art

Multimedia contents, including information such as voices, characters, and images, for television broadcasting are transmitted by use of radio waves, and multimedia contents for Internet Protocol Television (IPTV) are transmitted by the use of a network via Internet Protocol (IP).

Multimedia contents (hereinafter referred to as "data broadcast contents") transmitted by the data broadcasting and multimedia contents (hereinafter referred to as "IPTV contents") may be transmitted by Broadcast Markup Language (BML) documents described in BML, which is a contents-description language specific to digital television broadcasting.

The BML documents for displaying the data broadcast contents are encoded using a binary encoding method, are packaged into a DSMCC module, and are transmitted via a data carousel method of sending data repeatedly.

A receiving apparatus for receiving data broadcast includes a data broadcast browser for watching the data broadcast. The data broadcast browser develops the DSMCC module in a working memory, extracts the BML documents, and displays the data broadcast contents on a display.

On the other hand, the BML documents for displaying the IPTV contents are stored in a server in a network. A receiving apparatus for receiving the IPTV includes an IPTV browser for watching the IPTV. The IPTV browser acquires the BML documents stored in the server through the network by the same process as displaying a usual web site and displays the IPTV contents on a display.

The data broadcast and the IPTV have different methods of transmitting contents or providing contents, but have a commonality that the contents are the BML documents. Accordingly, a framework is provided allowing the BML document of the data broadcast and the BML document of the IPTV to be converted into each other.

For example, a television receiver that can display broadcast programs transmitted in a television broadcast manner and contents transmitted through a network is disclosed in Japanese Patent Application Publication No. 2004-312595.

However, a structure allowing the data broadcast browser and the IPTV browser to mutually utilize data contained in the contents is not known. In addition, it is difficult to mutually utilize the contents at the time of switching the data broadcast browser and the IPTV browser.

Thus, there is a need for allowing a data broadcast browser and an IPTV browser to mutually utilize data contained in contents.

SUMMARY

Consistent with an embodiment of the disclosure, there is provided a receiving apparatus comprising memory means having a first memory area accessible by a first provider providing first contents and a second memory area accessible by a second provider providing second contents; receiving means for receiving a first access right file transmitted along with the first contents and receiving a second access right file transmitted along with the second contents, the first access right file indicating whether the first memory area is accessible by the second provider, the second access right file indicating whether the second memory area is accessible by the first provider; output means for outputting the first contents or the second contents; memory control means for storing first information associated with the first contents in the first memory area and storing second information associated with the second contents in the second memory area; and switching means for switching from outputting the first contents to outputting the second contents, wherein the switching means includes determining means for determining whether the second provider is permitted to access the first memory area; and output control means for reading the first information and outputting the second contents based on the first information to the output means when the second provider is permitted to access the first memory area.

Consistent with another embodiment of the disclosure, there is provided a receiving method comprising providing a first memory area accessible by a first provider providing first contents; providing a second memory area accessible by a second provider providing second contents; receiving a first access right file transmitted along with the first contents, the first access right file indicating whether the first memory area is accessible by the second provider; receiving a second access right file transmitted along with the second contents, the second access right file indicating whether the second memory area is accessible by the first provider; storing first information associated with the first contents in the first memory area; storing second information associated with the second contents in the second memory area; determining whether the second provider is permitted to access the first memory area; reading the first information and outputting the second contents based on the first information when the second provider is permitted to access the first memory area; and switching from outputting the first contents to outputting the second contents.

Consistent with another embodiment of the disclosure, there is provided a computer-readable storage medium having instructions that cause a receiving apparatus to perform a method comprising providing a first memory area accessible by a first provider providing first contents; providing a second memory area accessible by a second provider providing second contents; receiving a first access right file transmitted along with the first contents, the first access right file indicating whether the first memory area is accessible by the second provider; receiving a second access right file transmitted along with the second contents, the second access right file indicating whether the second memory area is accessible by the first provider; storing first information associated with the first contents in the first memory area; storing second information associated with the second contents in the second memory area; determining whether the second provider is permitted to access the first memory area; reading the first information and outputting the second contents based on the first information when the second provider is permitted to access the first memory area; and switching from outputting the first contents to outputting the second contents.

Consistent with another embodiment of the disclosure, there is provided a transmitting apparatus comprising access right file generating means for generating an access right file indicating whether a provider is permitted to access a memory area in a receiving apparatus accessible by the transmitting apparatus; and transmitting means for transmitting the access right file along with contents.

Consistent with another embodiment of the disclosure, there is provided a transmitting method comprising generating an access right file indicating whether a first provider is permitted to access a memory area in a receiving apparatus accessible by a second provider transmitting contents; and transmitting the access right file along with the contents.

Consistent with another embodiment of the disclosure, there is provided a computer-readable storage medium having instructions that cause a transmitting apparatus to perform a method comprising generating an access right file indicating whether a first provider is permitted to access a memory area in a receiving apparatus accessible by the transmitting apparatus; and transmitting the access right file along with contents.

Consistent with another embodiment of the disclosure, there is provided a receiving apparatus comprising a memory unit having a first memory area accessible by a first provider providing first contents and a second memory area accessible by a second provider providing second contents; a receiving unit configured to receive a first access right file transmitted along with the first contents and receive a second access right file transmitted along with the second contents, the first access right file indicating whether the first memory area is accessible by the second provider, the second access right file indicating whether the second memory area is accessible by the first provider; an output unit configured to output the first contents or the second contents; a memory control unit configured to store first information associated with the first contents in the first memory area and store second information associated with the second contents in the second memory area; and a switching unit configured to switch from outputting the first contents to outputting the second contents, wherein the switching unit includes a determining unit configured to determine whether the second provider is permitted to access the first memory area; and an output controller configured to read the first information and output the second contents based on the first information to the output unit when the second provider is permitted to access the first memory area.

Consistent with another embodiment of the disclosure, there is provided a transmitting apparatus comprising an access right file generating unit configured to generate an access right file indicating whether a provider is permitted to access a memory area in a receiving apparatus accessible by the transmitting apparatus; and a transmitting unit configured to transmit the access right file along with the contents.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 7 shows an exemplary XML document of an access right file.

DETAILED DESCRIPTION

Figure 1:
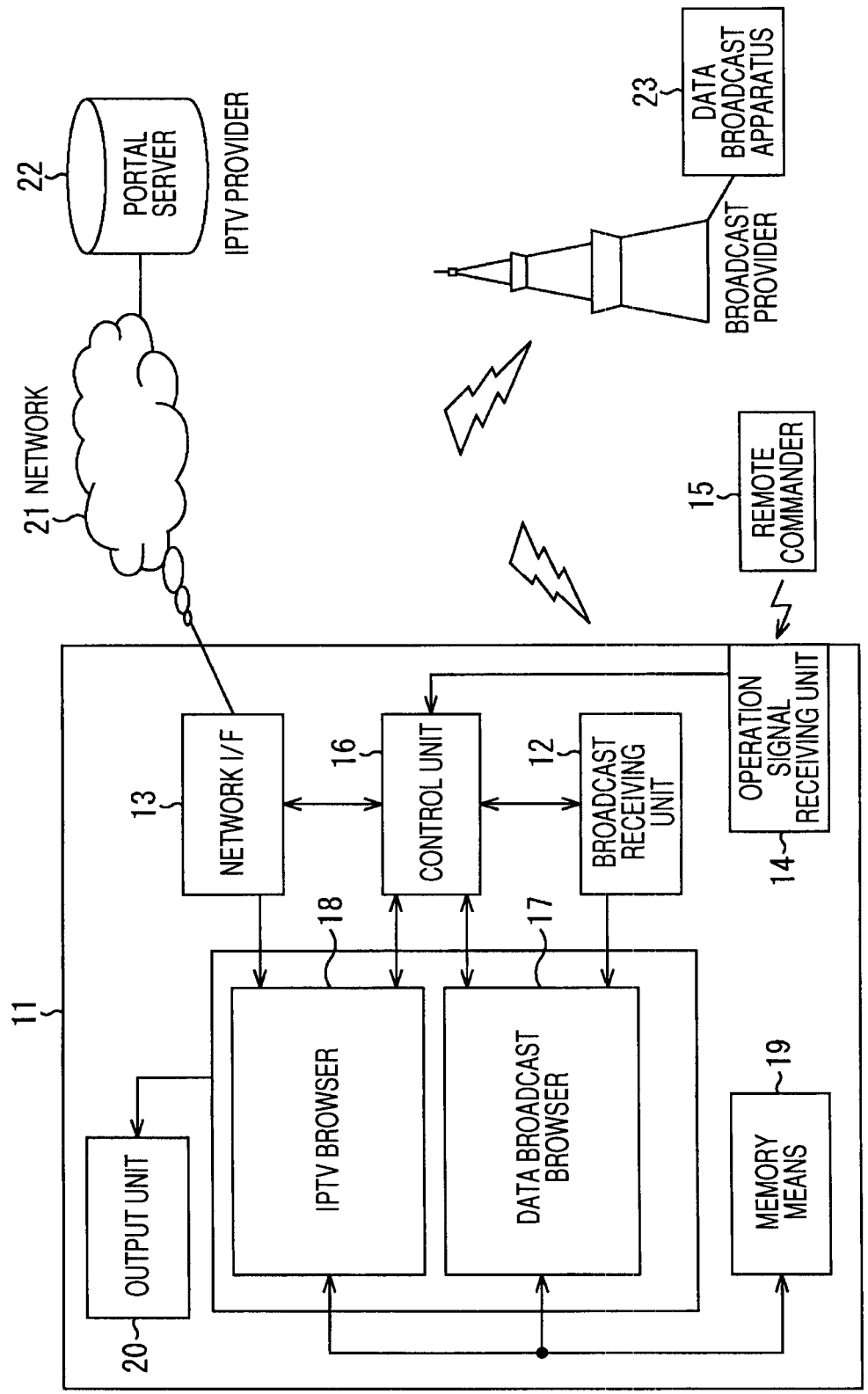
FIG. 1 shows an exemplary configuration of a contents receiving apparatus.

The following detailed description refers to the accompanying drawings. Wherever possible, the same reference numbers are used in the drawings and the following description to refer to the same or similar parts. While several exemplary embodiments and features of the disclosure are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 shows an exemplary configuration of a contents receiving apparatus. In FIG. 1, a contents receiving apparatus 11 may include a broadcast receiving unit 12, a network interface (I/F) 13, an operation signal receiving unit 14, a remote commander 15, a control unit 16, a data broadcast browser 17, an IPTV browser 18, a memory unit 19, and an output unit 20. The network I/F 13 of the contents receiving apparatus 11 may be connected to portal servers 22 storing BML documents of IPTV contents provided by various IPTV providers through a network 21.

The broadcast receiving unit 12 may receive television broadcast radio waves transmitted from a data broadcast apparatus 23 of a broadcast provider, acquire a contents package broadcasted or transmitted by the radio waves through an antenna, and store the acquired contents package in the memory unit 19 via the data broadcast browser 17. The contents package may include a BML document of data broadcast contents, an access right file containing a right to access a predetermined area of the memory unit 19, and signature data used to validate the access right file.

The network I/F 13 may communicate with the portal servers 22 through the network 21. Under the control of the control unit 16, the network I/F 13 may request the portal servers 22 for a contents package including the BML document of the IPTV contents provided by a predetermined IPTV provider and acquire the content package transmitted from the portal server 22.

The network I/F 13 may supply the IPTV browser 18 with the BML document of the IPTV contents included in the contents package from the portal server 22 and supply the control unit 16 with the access right file and the signature data.

The operation signal receiving unit 14 may receive a control signal transmitted from the remote commander 15 and supply the received control signal to the control unit 16.

The remote commander 15 may be operated by a user and transmit the control signal corresponding to the operation by the use of, for example, an electromagnetic wave or infrared ray. The user may operate the remote commander 15 to instruct to reproduce the data broadcast contents or the IPTV contents or to instruct to switch the data broadcast contents and the IPTV contents to each other.

The control unit 16 may be supplied with the control signal corresponding to the user's operation from the operation signal receiving unit 14. The control unit 16 may control the units of the contents receiving apparatus 11 in accordance with the control signal.

The data broadcast browser 17 may read the BML document of the data broadcast contents which the user has instructed to reproduce from the memory unit 19 under the control of the control unit 16 and output the data broadcast contents to the output unit 20 based on the BML document.

The data broadcast browser 17 may store meta data of the data broadcast contents in a predetermined area of the memory unit 19 at the time of outputting the data broadcast contents to the output unit 20. The meta data of the data broadcast contents may include information on channel names of a broadcast station broadcasting the data or details of the data broadcast, information on the players appearing in a program interlocking with the data broadcast, and electronic coupons or points generated in the data broadcast.

The BML document of the IPTV contents may be supplied to the IPTV browser 18 from the network I/F 13. The IPTV browser 18 may output the IPTV contents to the output unit 20 based on the BML document and store the meta data of the IPTV contents in a predetermined area of the memory unit 19.

The memory unit 19 may be a recording medium such as a hard disk drive or a flash memory (for example, Electronically Erasable and Programmable Read Only Memory (EEPROM)).

An accessible area for each of the broadcast providers providing the data broadcast contents and the IPTV providers providing the IPTV contents may be set in the memory unit 19. For example, a contents package transmitted from a broadcast provider or meta data of the data broadcast contents provided by the broadcast provider may be stored in an area accessible by the broadcast provider. Meta data of the IPTV contents provided by an IPTV provider may be stored in an area accessible by the IPTV provider.

The broadcast provider or the IPTV provider may permit another provider to access its accessible area. For example, the broadcast provider or the IPTV provider may describe an identification (ID) for identifying other providers permitted access in the access right file contained in the contents package.

A certificate used to validate the access right file may be stored in the memory unit 19. For example, before determining whether the access to a predetermined area is permitted based on the access right file, the control unit 16 may validate the access right file by the use of the certificate stored in the memory unit 19 and the signature data contained in the contents package.

For example, the certificate corresponding to the signature data contained in the contents package of the data broadcast contents may be transmitted by a broadcast wave. When receiving the certificate transmitted by the broadcast wave, the broadcast receiving unit 12 may store the certificate in the memory unit 19 via the data broadcast browser 17. The certificate corresponding to the signature data contained in the contents package of the IPTV contents may be stored in the portal servers 22. The network I/F 13 may acquire the certificate from the portal servers 22 and store the acquired certificate in the memory unit 19 via the IPTV browser 18 depending on a need for a process of validating the access right file.

The output unit 20 may include, for example, a display or a speaker, display characters or images on a display based on the data broadcast contents supplied from the data broadcast browser 17 or the IPTV contents supplied from the IPTV browser 18, and output voices from the speaker.

Figure 2:
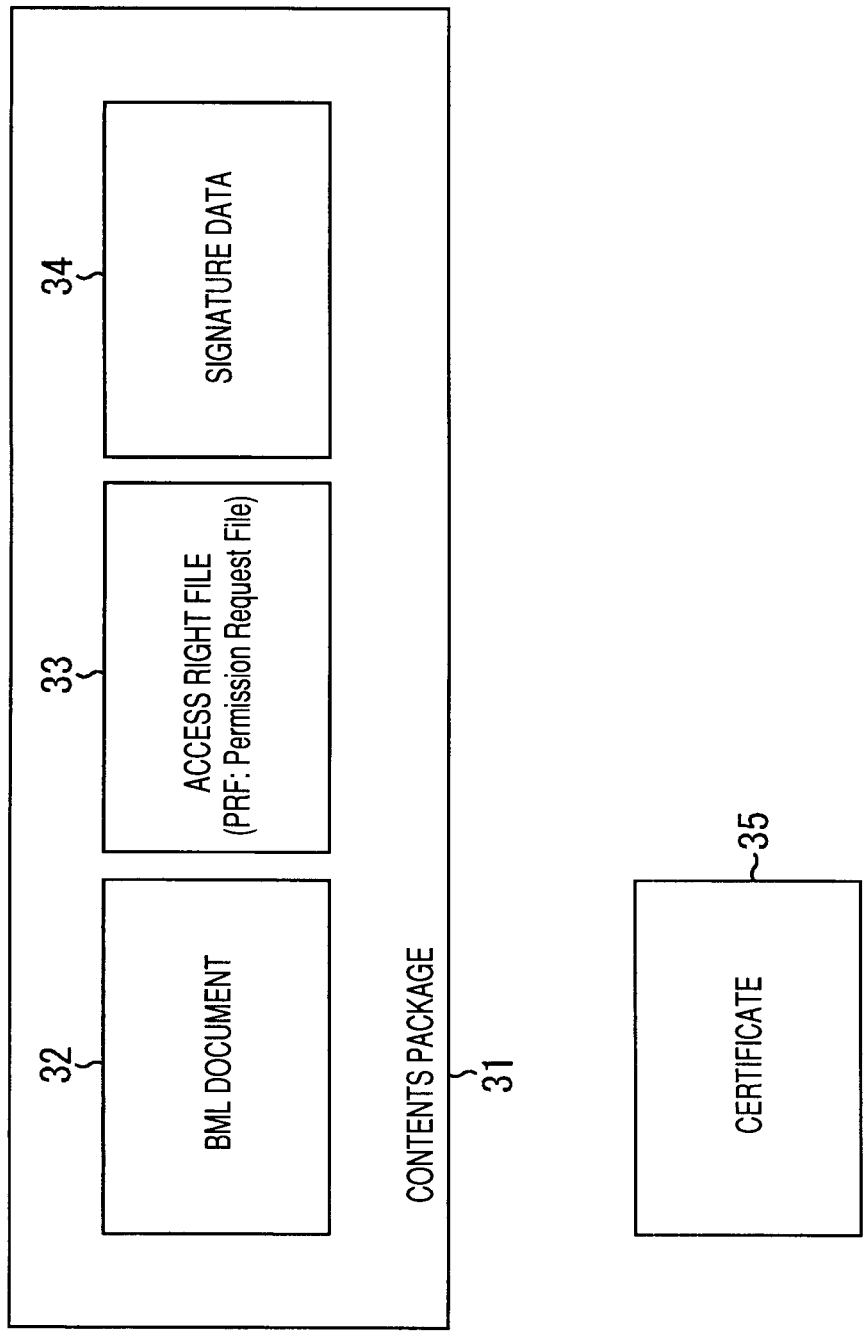
FIG. 2 shows an exemplary structure of a contents package.

FIG. 2 shows an exemplary structure of a contents package. As shown in FIG. 2, the contents package 31 may include a BML document 32, an access right file (e.g., Permission Request File (PRF)) 33, and signature data 34.

The data broadcast contents or the IPTV contents may be described in the BML document 32.

The access right file 33 may include an ID for identifying other provider which a broadcast provider or an IPTV provider permits to access its accessible area, a file name of a file to which the access is permitted, and a period of time when the access is permitted. The file to which the access is permitted to another provider may be referred to as a "shared file."

The signature data 34 may validate the access right file, that is, authenticate the transmitter (for example, the broadcast provider or the IPTV provider) of the access right file and guarantee that the access right file is not falsified, along with the certificate 35 stored in the memory unit 19.

Figure 3:
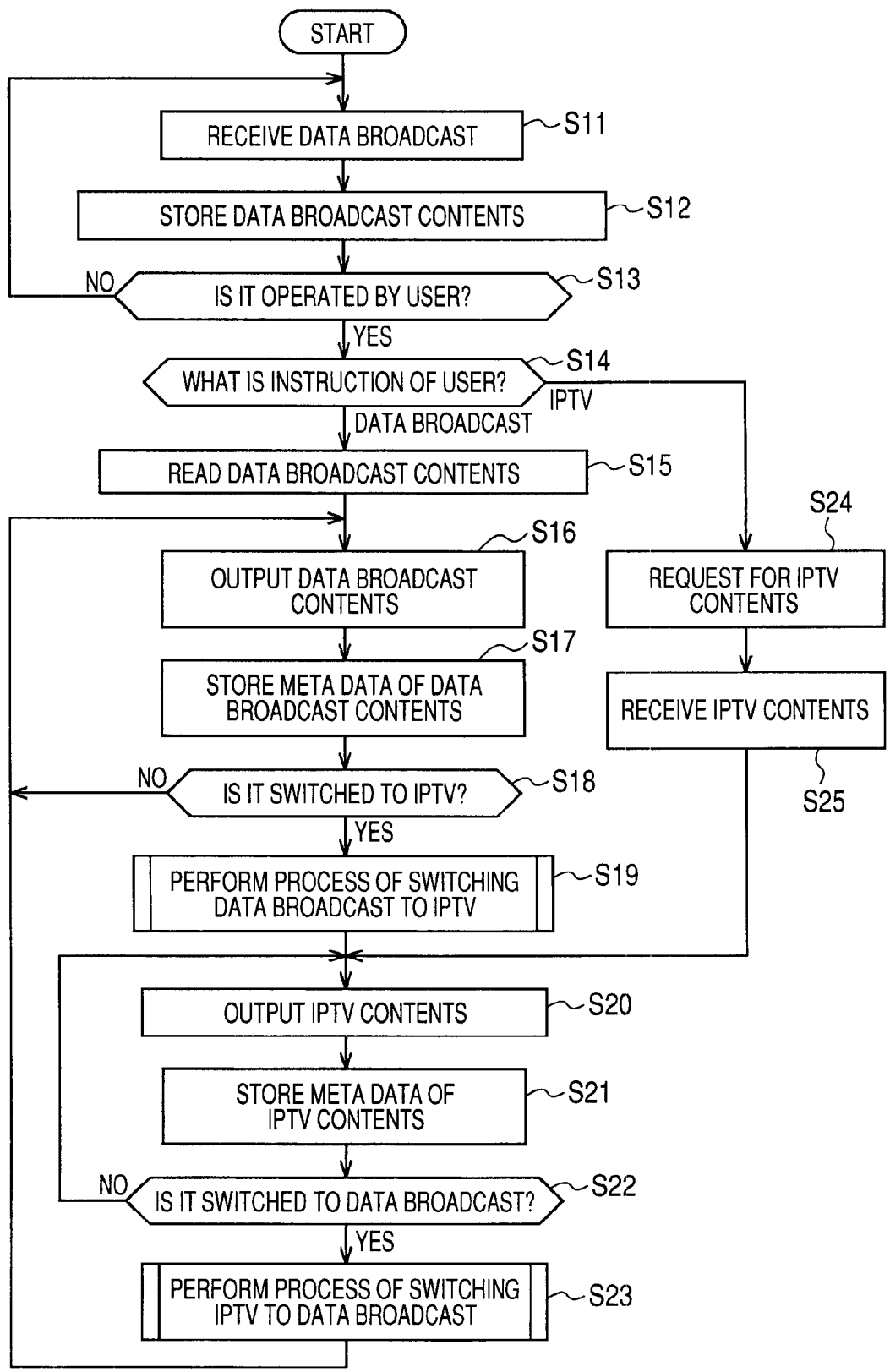
FIG. 3 shows an exemplary process of allowing the contents receiving apparatus to switch an output of contents.

FIG. 3 shows an exemplary process of allowing the contents receiving apparatus 11 of FIG. 1 to switch the output of contents. For example, a broadcast provider may periodically transmit a contents package including a BML document of data broadcast contents by the data broadcast and the broadcast receiving unit 12 may receive a contents package transmitted by the data broadcast in step S11.

In step S12, the broadcast receiving unit 12 may store the contents package received in step S11 in the memory unit 19 via the data broadcast browser 17.

In step S13, the control unit 16 may determine whether a user is performing an operation. For example, when a user operates a remote commander 15 and the operation signal based on the operation is supplied through the operation signal receiving unit 14, the control unit 16 may determines that the user is performing an operation. On the other hand, when the operation signal is not supplied, the control unit 16 may determine that the user is not performing an operation.

When the control unit 16 determines in step S13 that the user is not performing an operation, step S11 and step S12 may be repeated. On the other hand, when the control unit determines that the user is performing an operation, step S14 may be performed. In step S14, the control unit 16 may determine whether the user instructs to reproduce the data broadcast contents or to reproduce the IPTV contents, based on the operation signal having been determined in step S13.

When the control unit 16 determines in step S14 that the user instructs to reproduce the data broadcast contents, step S15 may be performed. In step S15, the data broadcast browser 17 may read the data broadcast contents to be reproduced in response to the user's operation from the memory unit 19 under the control of the control unit 16.

In step S16, the data broadcast browser 17 may output the data broadcast contents read in step S15 to the output unit 20.

In step S17, the data broadcast browser 17 may store the meta data of the data broadcast contents output to the output unit 20 in step S16 as a shared file in an area of the memory unit 19 accessible by the broadcast provider providing the data broadcast contents.

The control unit 16 may determine whether to switch the output to the output unit 20 from the data broadcast contents to the IPTV contents, in accordance with the user's operation in step S18.

When the control unit 16 determines in step S18 that the output to the output unit 20 should not be switched from the data broadcast contents to the IPTV contents, step S16 may be performed again, where the data broadcast browser 17 continues to output the data broadcast contents to the output unit 20.

When the control unit 16 determines in step S18 that the output to the output unit 20 should be switched from the data broadcast contents to the IPTV contents, step S19 may be performed. In step S19, the control unit 16 may perform a process (shown in FIG. 4) of switching the data broadcast contents to the IPTV contents.

In step S20, the IPTV browser 18 may output the IPTV contents received in the process of switching the data broadcast contents to the IPTV contents to the output unit 20.

In step S21, the IPTV browser 18 may store the meta data of the IPTV contents output to the output unit 20 in step S20 as a shared file in an area of the memory unit 19 accessible by the IPTV provider providing the IPTV contents.

In step S22, the control unit 16 may determine whether the output to the output unit 20 should be switched from the IPTV contents to the data broadcast contents in accordance with the user's operation.

When the control unit 16 determines in step S22 that the output to the output unit 20 should not be switched from the IPTV contents to the data broadcast contents, the IPTV browser 18 may continue to output the IPTV contents to the output unit 20 in step S20.

When the control unit 16 determines in step S22 that the output to the output unit 20 should be switched from the IPTV contents to the data broadcast contents, step S23 may be performed. In step S23, the control unit 16 may perform a process (shown in FIG. 5) of switching the IPTV contents to the data broadcast contents, and then step S16 and subsequent steps may be repeated.

When the control unit 16 determines in step S14 that the user instructs to reproduce the IPTV contents, the network I/F 13 may request the portal server 22 for predetermined IPTV contents through the network 21 under the control of the control unit 16 in step S24.

In step S25, the network I/F 13 may receive the contents package including the BML document of the IPTV contents requested for in step S24 from the portal server 22. The network I/F 13 may supply the IPTV browser 18 with the BML document of the IPTV contents included in the contents package from the portal server 22 and supply the control unit 16 with the access right file and the signature data included in the contents package.

After step S25, step S20 and subsequent steps may be performed. In this case, the IPTV browser 18 outputs the IPTV contents received in step S25 to the output unit 20 in step S20.

Figure 4:
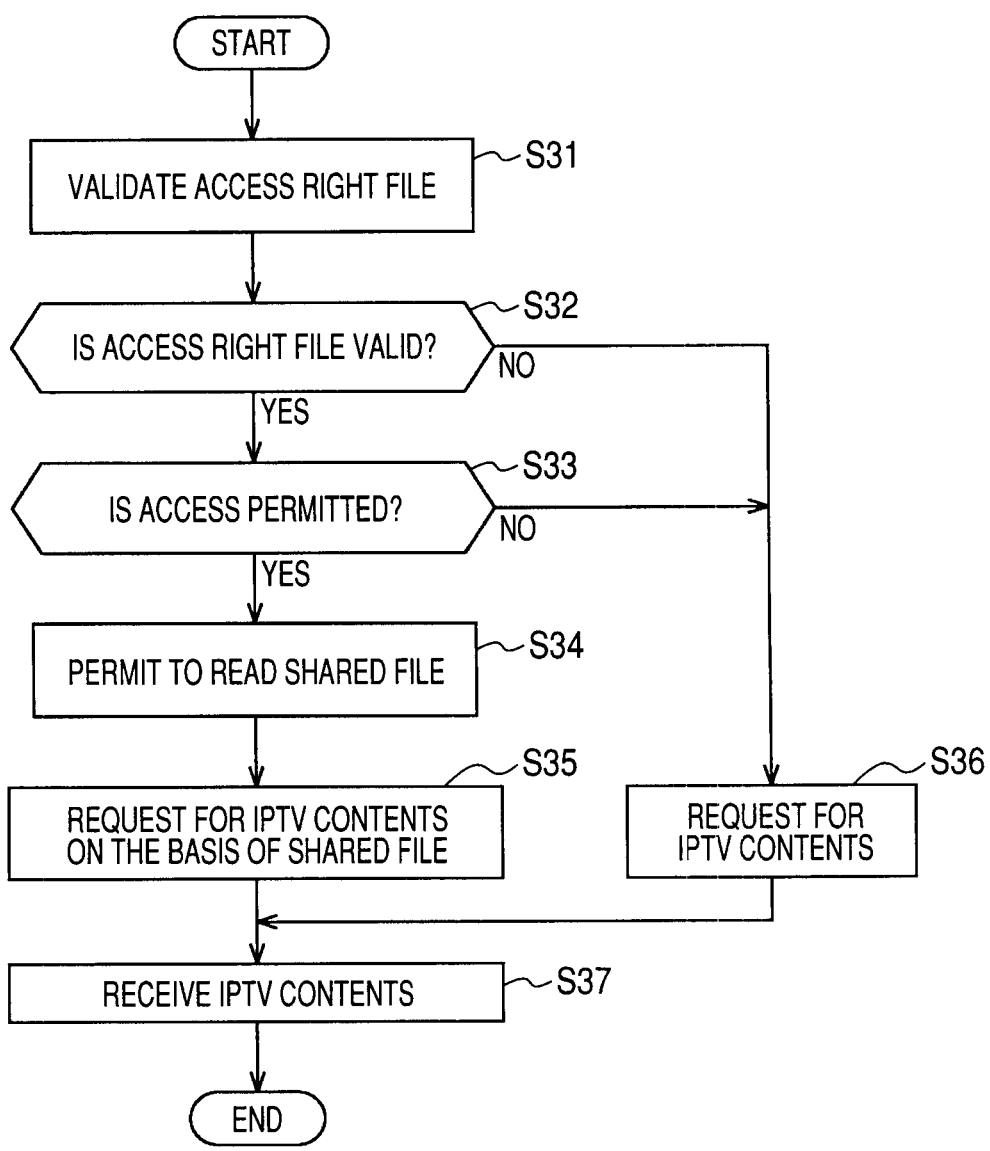
FIG. 4 shows an exemplary process of switching data broadcast contents to IPTV contents.

FIG. 4 shows an exemplary process of switching the data broadcast contents to the IPTV contents in step S19 of FIG. 3.

In step S31, the control unit 16 may read the access right file and the signature data included in the contents package along with the BML document of the data broadcast contents output to the output unit 20, and the certificate of the broadcast provider providing the data broadcast contents from the memory unit 19 through the data broadcast browser 17. The control unit 16 may validate the access right file by the use of the signature data and the certificate read from the memory unit 19.

In step S32, the control unit 16 may determine whether the access right file validated in step S31 is valid.

When the control unit 16 determines in step S32 that the access right file is valid, step S33 may be performed. In step S33, the control unit 16 may determine whether the IPTV provider providing the IPTV contents of which the switching is instructed by the user is permitted to read the shared file of the data broadcast contents output to the output unit 20 based on the description of the access right file.

For example, when a file name of a shared file of the data broadcast contents output to the output unit 20 is described in the access right file, the period of time for permitting the access to the file is valid, and an ID for identifying the IPTV provider providing the IPTV contents of which the switching is instructed by the user is described therein (that is, the broadcast provider providing the data broadcast contents output to the output unit 20 permits the IPTV provider to access its accessible area of the memory unit 19), the control unit 16 may determine that the IPTV provider is permitted to read the shared file.

When the control unit 16 determines in step S33 that the IPTV provider providing the IPTV contents of which the switching is instructed by the user is permitted to read the shared file of the data broadcast contents output to the output unit 20, step S34 may be performed. In step S34, the control unit 16 may permit the network I/F 13 to read the shared file of the data broadcast contents output to the output unit 20, and the network I/F 13 may read the shared file, that is, the meta data of the data broadcast contents output to the output unit 20, from the memory unit 19 through the IPTV browser 18.

In step S35, the network I/F 13 may request the portal server 22 for the IPTV contents based on the meta data read in step S34.

When the control unit 16 determines in step S32 that the access right file is not valid, or when the control unit determines in step S33 that the IPTV provider providing the IPTV contents of which the switching is instructed by the user is not permitted to read the shared file of the data broadcast contents output to the output unit 20, based on the description of the access right file, step S36 may be performed. In step S36, the network I/F 13 may request the portal server 22 for the IPTV contents.

In step S37, when the contents package including the BML document of the IPTV contents requested to the portal server 22 in step S35 or S36 is transmitted from the portal server 22, the network I/F 13 may supply the BML document of the IPTV contents included in the contents package to the IPTV browser 18 and supply the access right file and the signature data included in the contents package to the control unit 16, thereby ending the process of switching the data broadcast contents to the IPTV contents.

By using the access right file to permit the IPTV provider to access areas accessible by the broadcast provider, the IPTV provider may read the shared file and transmit the IPTV contents based on the shared file. That is, it is possible to allow the data broadcast contents to interlock with the IPTV contents.

By using the signature data and the certificate to validate the access right file, falsifying the access right file may be prevented, and thus preventing a provider who is not permitted by the broadcast provider from accessing the area accessible by the broadcast provider. Specifically, the ID of a provider who is permitted by the broadcast provider written in the access right file may be prevented from being rewritten without permission.

Instead of two browsers for the data broadcast browser 17 and the IPTV browser 18, one browser may process both the data broadcast contents and the IPTV contents, and the data broadcast contents and the IPTV contents may be switched by the browser.

When a portal server 22 and a data broadcasting apparatus 23 are aware of the internal (local) structure of the memory unit 19, a shared file may be designated based on the internal structure.

Figure 5:
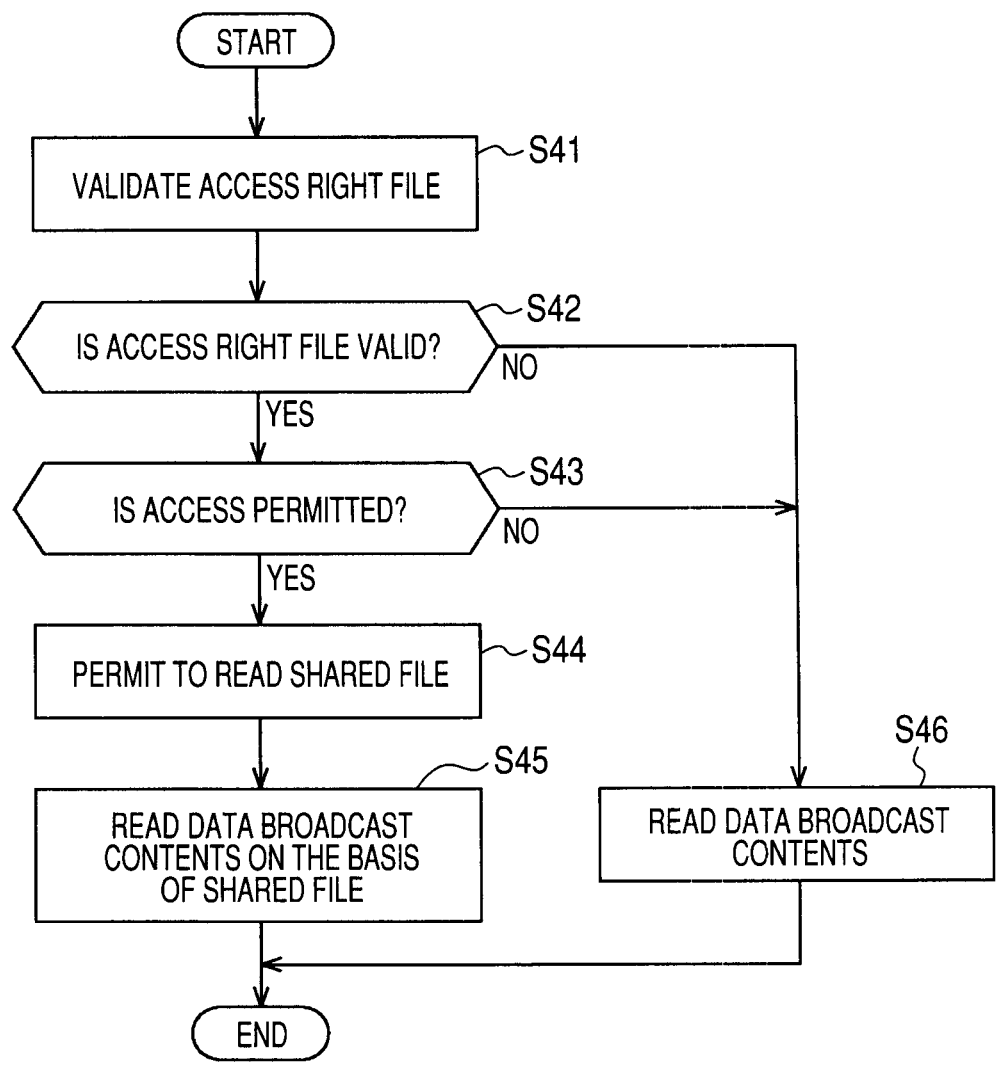
FIG. 5 shows an exemplary process of switching IPTV contents to data broadcast contents.

FIG. 5 shows an exemplary process of switching the IPTV contents to the data broadcast contents in step S23 of FIG. 3.

In step S41, the control unit 16 may read the certificate of the IPTV provider providing the IPTV contents output to the output unit 20 from the memory unit 19 through the IPTV browser 18. Then, the control unit 16 may validate the access right file supplied along with the signature data using the signature data supplied from the network I/F 13 in step S25 of FIG. 3 or step S37 of FIG. 4. The signature data may be included in the contents package along with the BML document of the IPTV contents output to the output unit 20.

In step S42, the control unit 16 may determine whether the access right file validated in step S41 is valid.

When the control unit 16 determines in step S42 that the access right file is valid, step S43 may be performed. In step S43, the control unit 16 may determine whether the broadcast provider providing the broadcast contents of which the switching is instructed by the user is permitted to read the shared file of the IPTV contents output to the output unit 20 based on the description of the access right file.

When the control unit 16 determines in step S43 that the broadcast provider providing the broadcast contents of which the switching is instructed by the user is permitted to read the shared file of the IPTV contents output to the output unit 20, step S44 may be performed. In step S44, the control unit 16 may permit the data broadcast browser 17 to read the shared file of the IPTV contents output to the output unit 20, and the data broadcast browser 17 may read the shared file, that is, the meta data of the IPTV contents output to the output unit 20, from the output unit 20.

In step S45, the data broadcast browser 17 may search for the data broadcast contents stored in the memory unit 19 based on the meta data read in step S44 and read the data broadcast contents corresponding to the meta data from the memory unit 19.

When the control unit 16 determines in step S42 that the access right file is not valid or the control unit 16 determines in step S43 that the broadcast provider providing the broadcast contents of which the switching is instructed by the user is permitted to read the shared file of the IPTV contents output to the output unit 20, step S46 may be performed. In step S46, the data broadcast browser 17 may read the data broadcast contents from the memory unit 19.

After step S45 or step S46, the process of switching the IPTV contents to the data broadcast contents is ended.

By using the access right file, the IPTV provider may permit the broadcast provider to access an area accessible by the IPTV provider, whereby the IPTV contents and the data broadcast contents may interlock with each other.

Next, an exemplary process of switching the data broadcast contents to the IPTV contents is described with reference to FIG. 6.

Figure 6:
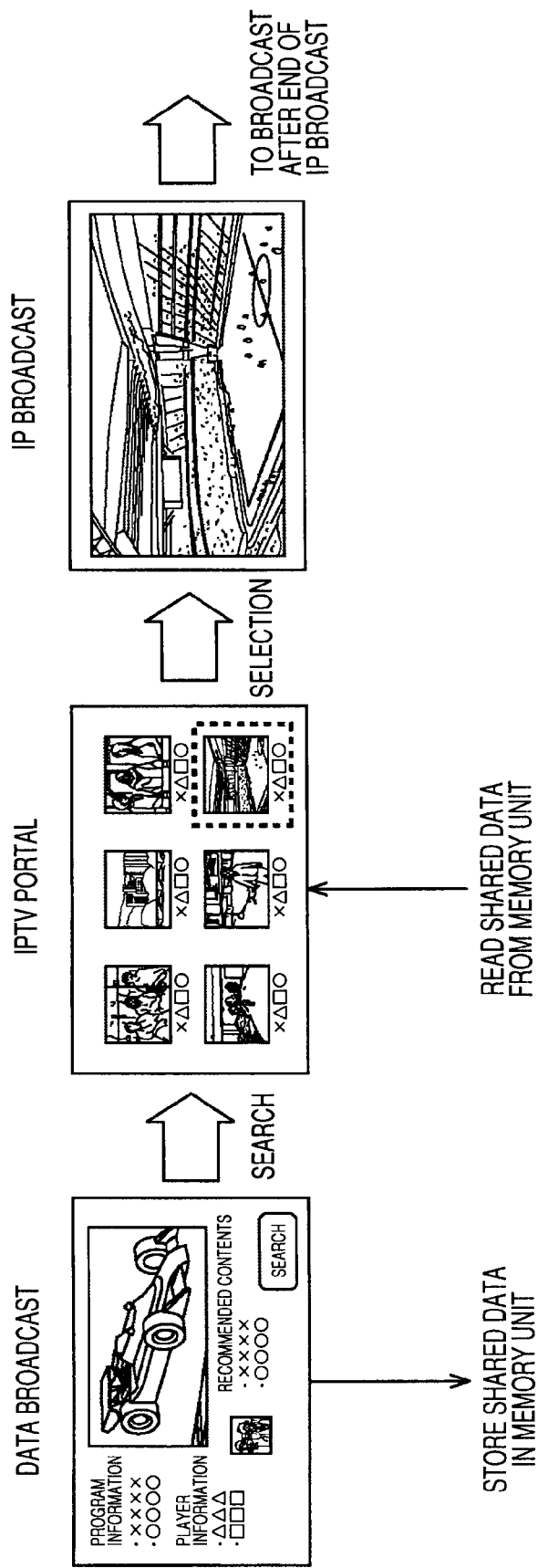
FIG. 6 shows an exemplary process of switching data broadcast contents to IPTV contents.

FIG. 6 includes an exemplary picture of the data broadcast contents at the left side, an exemplary picture of an IPTV portal site at the center, and an exemplary picture of the IPTV contents at the right side.

The data broadcast browser 17 may output the data broadcast contents to the output unit 20 based on the BML document of the data broadcast contents to be reproduced among the BML documents of the contents package stored in the memory unit 19 in response to the user's operation and display a picture of the data broadcast on the display of the output unit 20 (for example, step S16 of FIG. 3).

The data broadcast browser 17 may store the meta data of the data broadcast contents output to the output unit 20 (for example, program information, player information, and information indicating recommended contents) as shared data in a predetermined area of the memory unit 19 (for example, step S17 of FIG. 3).

As shown in FIG. 6, a search button for searching for the IP broadcast associated with the data broadcast may be displayed on the picture of the data broadcast. When the user operates the remote commander 15 to select (focus on) the search button and to instruct to perform the search, the control unit 16 may determine that the output to the output unit 20 is switched from the data broadcast contents to the IPTV contents (for example, step S18 of FIG. 3).

In the process of switching the data broadcast contents to the IPTV contents, when the access right file is valid and the IPTV provider providing the IPTV contents for searching the IP broadcast associated with the data broadcast is permitted to access the shared file, the network I/F 13 may read the meta data (shared data) of the data broadcast contents onto the left picture of FIG. 6 from the memory unit 19 through the IPTV browser 18 (for example, step S34 of FIG. 4).

The network I/F 13 may search the IPTV contents using the meta data as a search key word and request the portal server 22 to transmit the search result (for example, step S35 of FIG. 4). The portal server 22 may transmit a thumbnail of the IPTV contents obtained as the search result using the meta data as the search key word.

Accordingly, the IPTV browser 18 may display a picture of the IPTV portal site, which provides a list of thumbnails of the IPTV contents obtained as the search result using the meta data as the search key word, on the output unit 20 (for example, step S20 of FIG. 3).

Then, when the user operates the remote commander 15 to select the thumbnail of the IPTV contents, the IPTV browser 18 may output the IPTV contents (video) corresponding to the thumbnail selected by the user to the output unit 20. For example, when the IPTV contents output by the IPTV browser 18 is ended, the output to the output unit 20 may be switched (or returned) to the data broadcast contents.

Accordingly, the contents receiving apparatus 11 may output the IPTV contents indicating the search result based on the meta data of the data broadcast contents by using the shared data at the time of switching the data broadcast contents to the IPTV contents.

In addition to displaying the search result in a continuous drama, data of piece number watched by a user may be stored as the shared data and a specific image for only the user having watched the entire pieces may be transmitted as the IPTV contents based on the shared data when the user having watched the entire pieces starts the IPTV contents at the end of the continuous drama.

Based on data of the piece number not watched, the purchase of the piece number not watched in the IPTV contents may be suggested. For example, points given to the user having watched predetermined data broadcast contents or IPTV contents may be used as the shared data and a specific service may be provided to the user depending on the accumulation of the points.

For example, in the process of switching the IPTV contents to the data broadcast contents, when the points accumulated by watching the IPTV contents (or total points including the other IPTV contents provided from the IPTV provider providing the IPTV contents) as the shared data read from the memory unit 19 by the data broadcast browser 17 reaches a predetermined number, the data broadcast browser 17 may read the data broadcast contents including a specific image from the memory unit 19 (for example, step S45 in FIG. 5) based on the shared data and output the data broadcast contents.

In the process of switching the data broadcast contents to the IPTV contents, when the points used as the shared data reach the predetermined value, the IPTV browser 18 may request the portal server 22 for specific IPTV contents and output the specific IPTV contents.

User information on the user using the contents receiving apparatus 11 may be used as the shared data. For example, at the time of switching the contents, the data broadcast browser 17 or the IPTV browser 18 may output specific contents corresponding to the user's taste or the search result specific to the user's search history based on the user information.

FIG. 7 shows an exemplary XML document of the access right file. The first row of the XML document may be an XML declaration and designate, for example, 1.0 as a version.

An ID (appid) of the contents transmitted with the same contents package as the access right file and an ID (orgid) of a provider (broadcast provider or IPTV provider) providing the contents may be described in the second row of the XML document. In the example shown in FIG. 7, the ID of the data broadcast contents is "0x4010" and the ID of the broadcast provider is "0x00002134."

An ID (grantoridentifier id) of a permitted provider (broadcast provider or IPTV provider) which is permitted to access an area accessible by the broadcast provider providing the data broadcast contents may be described in the fourth row of the XML document. In the example shown in FIG. 7, the ID of the permitted provider is "0x01."

The date of validity of the access right file may be described in the fifth row of the XML document. In the example shown in FIG. 7, the date of validity is "24/12/2032."

A flag indicating the permission of reading and writing the shared file and URL (Uniform Resource Locator) (the file name including the path) of the shared file may be described in the sixth and seventh rows of the XML document. In the example shown in FIG. 7, a "true" flag indicating the permission for the reading of the shared file and a "false" flag indicating no permission for the writing of the shared file are included. The URL of the sixth row is "5/15/dir1/scores" and the URL of the seventh row is "5/15/dir1/names."

The signature data may be described in the eighth row of the XML document. For example, the signature data may be included in the contents package independently of the access right file or the signature data may be included in the access right file.

RFC3075 as the XML Digital Signature Standard may be used for the signature of the XML data. The signature technique is not limited to the above-mentioned methods, and the signature may be made by other methods.

The ID of a leaf certificate may be described in the ninth row of the XML document. The leaf certificate may mean, for example, a low-layer certificate in a layer certificate model of PGP.

As shown in FIG. 7, the access right file may be prepared by the data broadcast apparatus 23 shown in FIG. 1. The data broadcast apparatus 23 may transmit the contents package including the access right file and the data broadcast contents.

Figure 8:
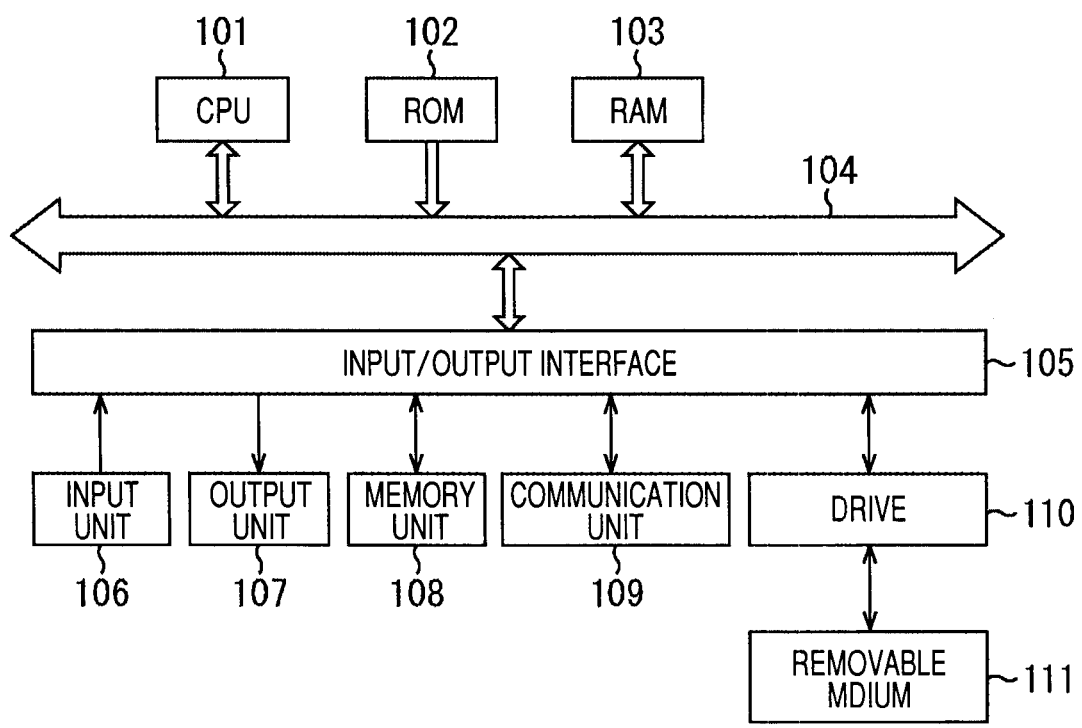
FIG. 8 shows an exemplary configuration of a computer.

FIG. 8 shows an exemplary configuration of a computer constituting the data broadcast apparatus 23. In the computer shown in FIG. 8, a Central Processing Unit (CPU) 101, a Read Only Memory (ROM) 102, and a Random Access Memory (RAM) 103 may be connected to one another through a bus 104.

An input/output interface 105 may be connected to the bus 104. The input/output interface 105 may also be connected to an input unit 106 including a keyboard, a mouse, and a microphone, an output unit 107 including a display and a speaker, a memory unit 108 including a hard disk or a non-volatile memory, a communication unit 109 including a network interface, and a driver 110 driving a removable medium 111 such as a magnetic disk, an optical disk, and a semiconductor memory.

The data broadcast apparatus 23 may perform a process of transmitting the contents package by allowing the CPU 101 to load a program stored in the memory unit 108 to the RAM 103 through the input/output interface 105 and the bus 104 and to execute the loaded program.

Figure 9:
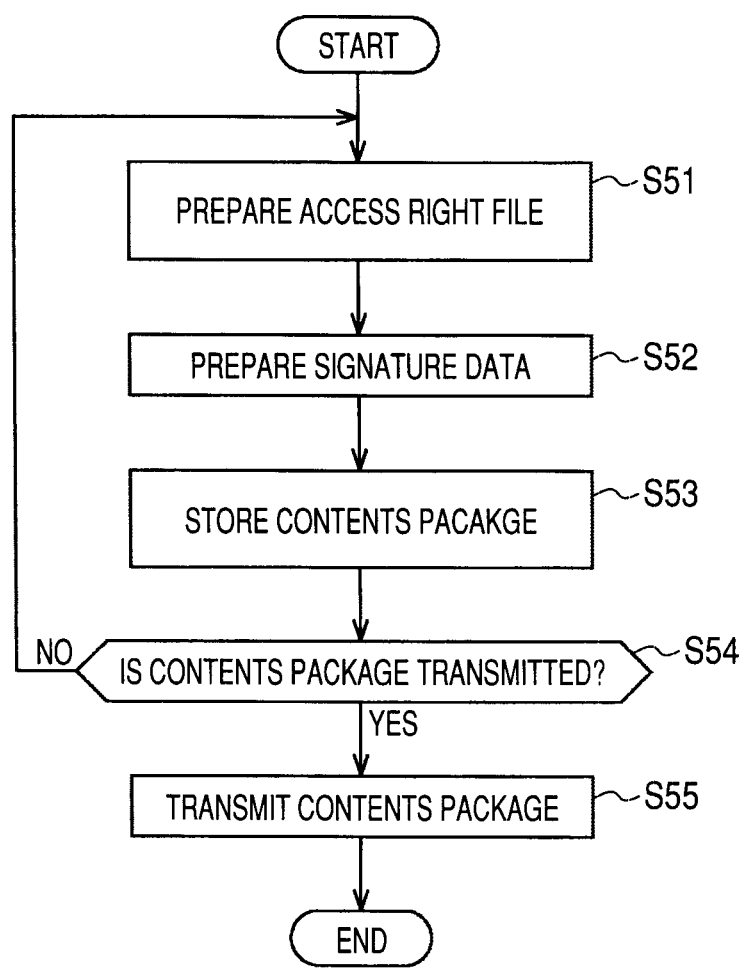
FIG. 9 shows an exemplary process of transmitting a contents package.

FIG. 9 shows an exemplary process of transmitting the contents package of the data broadcast apparatus 23. In step S51, when the data broadcast contents to be transmitted in the data broadcast is input to the data broadcast apparatus 23, the CPU 101 may prepare an access right file in accordance with a predetermined setting. For example, in the data broadcast apparatus 23, a list of IPTV providers who are permitted access by the broadcast provider and the date of validity may be stored in the memory unit 108, and the CPU 101 may prepare the access right file based on the list and the date.

In step S52, the CPU 101 may prepare signature data based on a certificate transmitted in advance and the access right file prepared in step S51.

In step S53, the CPU 101 may prepare a contents package including the access right file prepared in step S51, the signature data prepared in step S52, and the data broadcast contents, which are input to the data broadcast apparatus 23, to be transmitted in the data broadcast, and store the contents package in the memory unit 108.

In step S54, the CPU 101 may determine whether the contents package stored in the memory unit 108 should be transmitted. For example, the CPU 101 of the data broadcast apparatus 23 may determine that the contents package stored in the memory unit 108 should be transmitted at a transmission time for periodically transmitting data. Alternatively, the CPU 101 may determine that the contents package stored in the memory unit 108 should not be transmitted at the other times.

When the CPU 101 determines in step S54 that the contents package stored in the memory unit 108 should not be transmitted, steps S51 through S53 may be repeated.

When the CPU 101 determines in step S54 that the contents package stored in the memory unit 108 should be transmitted, the CPU 101 may control the communication unit 109 to transmit the contents package stored in the memory unit 108 in step S55, thereby ending the process.

When the data broadcast contents to be transmitted in the data broadcast is input to the data broadcast apparatus 23, the access right file and the signature data of the data broadcast contents may be prepared and transmitted along with the data broadcast contents. Accordingly, the contents receiving apparatus 11 having received the contents package including the data broadcast contents, the access right file, and the signature data may switch the data broadcast contents and the IPTV contents to each other using the shared file.

FIG. 8 may also show an exemplary configuration of a computer constituting the portal server 22. The portal server 22 may transmit the contents package including the IPTV contents, the access right file, and the signature data.

FIG. 8 may also show an exemplary configuration of a computer constituting the contents receiving apparatus 11. The computer of FIG. 8 may perform the series of processes by allowing the CPU 101 to load the program stored in the memory unit 108 to the RAM 103 through the input/output interface 105 and the bus 104 and to execute the program.

The program executed by the computer (CPU 101) may be recorded in a removable medium 111 as a computer readable medium such as a magnetic disk (which includes a flexible disk), an optical disk (Compact Disc-Read Only Memory (CD-ROM)), a Digital Versatile Disc (DVD), an optical magnetic disk, or a semiconductor memory.

The programs may be installed in the memory unit 108 through the input/output interface 105 by fitting the removable medium 111 to the driver 110. The programs may be received by the communication unit 109 through wired or wireless transmission media and may be installed in the memory unit 108. Otherwise, the programs may be installed in the ROM 102 or the memory unit 108 in advance.

Embodiments consistent with the disclosure have been described with reference to the accompanying drawings. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the claimed invention may be implemented as a combination of hardware and software or in hardware alone. Examples of hardware include computing or processing systems, including personal computers, servers, laptops, mainframes, and micro-processors. Additionally, although aspects of the invention are described for being stored in memory, one skilled in the art will appreciate that these aspects can also be stored on other types of computer-readable media, such as secondary storage devices, for example, hard disks, magnetic disks, optical disks, solid state memory, or other forms of RAM or ROM.

Computer programs based on the written description and methods of this invention are within the skill of an experienced developer. The various programs or program modules can be created using any of the techniques known to one skilled in the art or can be designed in connection with existing software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A receiving apparatus, comprising:
a memory unit having a first predetermined memory area accessible by a first provider providing first contents and a second predetermined memory area accessible by a second provider providing second contents;
a receiving unit for receiving a first access right file transmitted along with the first contents from the first provider and receiving a second access right file transmitted along with the second contents from the second provider, the first access right file indicating whether the first predetermined memory area is accessible by the second provider, the second access right file indicating whether the second predetermined memory area is accessible by the first provider;
an output controller for outputting the first contents or the second contents;
a memory control unit for storing first information associated with the first contents in the first predetermined memory area and storing second information associated with the second contents in the second predetermined memory area; and
a switching unit for switching from outputting tile first contents to outputting the second contents, wherein the switching unit includes:
a determining unit for determining whether the first access right file includes an identifier representing the second provider; and
an output controller for reading the first information and outputting the second contents based on the first information to the output controller when the first access right file includes the identifier,
wherein a first certificate to validate the first access right file and a second certificate to validate the second access right file are stored in the memory, unit,
wherein the receiving unit receives first signature data transmitted along with the first contents for guaranteeing validity of the first contents and receives second signature data transmitted along with the second contents for guaranteeing validity of the second contents,
wherein the switching unit further includes a validating unit for validating the first access right file using, the first certificate and the first signature data and validating the second access right file using the second certificate and the second signature data, and
wherein the determining unit performs the determining when the first access right file is valid.

2. The receiving apparatus of claim 1, wherein the first contents are transmitted in a first transmission type and the second contents are transmitted in a second transmission type.

3. The receiving apparatus of claim 1, wherein the first provider and the second provider are different from each other.

4. A receiving method, comprising:
providing a first predetermined memory area accessible by a first provider providing first contents;
providing a predetermined second memory area accessible by a second provider providing second contents;
receiving a first access right file transmitted along with the first contents from the first provider, the first access right file indicating whether the first predetermined memory area is accessible by the second provider;
receiving a second access right file transmitted along with the second contents from a second provider, the second access right file indicating whether tile second predetermined memory area is accessible by the first provider;
storing first information associated with the first contents in the first predetermined memory area;
storing second information associated with the second contents in the second predetermined memory area;

determining whether the first access right file includes an identifier representing the second provider;
reading the first information and outputting the second contents based on the first information when the first predetermined memory area first access right file includes tile identifier;
switching from outputting the first contents to outputting the second contents;
storing a first certificate to validate the first access right file;
storing a second certificate to validate the second access right file;
receiving first signature data transmitted along with the first contents for guaranteeing validity of the first contents;
receiving second signature data transmitted along with the second contents for guaranteeing validity of the second contents;
validating the first access right file using the first certificate and the first signature data; and
validating the second access right file using the second certificate and the second signature data wherein the determining is performed when the first access right file is valid.

5. The receiving method of claim 4, further comprising:
transmitting the first contents in a first transmission type; and
transmitting the second contents in a second transmission type.

6. A non-transitory computer-readable storage medium having instructions that cause a receiving apparatus to perform a method, the method comprising:
providing a first predetermined memory area accessible by a first provider providing first contents;
providing a second predetermined memory area accessible by a second provider providing second contents;
receiving a first access right file transmitted along with the first contents from the first provider, the first access right file indicating whether the first predetermined memory area is accessible by the second provider;
receiving a second access right file transmitted along with the second contents from the second provider, the second access right file indicating whether the second predetermined memory area is accessible by the first provider;
storing first information associated with the first contents in the first predetermined memory area;
storing second information associated with the second contents in the second predetermined memory area;
determining whether the first access right file includes an identifier representing the second provider;
reading the first information and outputting the second contents based on the first information when the first access right file includes the identifier;
switching from outputting the first contents to outputting the second contents;
storing a first certificate to validate the first access right file;
storing a second certificate to validate the second access right file;
receiving first signature data transmitted on with the first contents for guaranteeing validity of the first contents;
receiving second signature data transmitted along with the second contents for guaranteeing validity of the second contents;
validating the first access right file using the first certificate and the first signature data; and
validating the second access right file using the second certificate and the second signature data wherein the determining is performed when the first access right file is valid.

7. The non-transitory computer-readable storage medium of claim 6, wherein the first contents are transmitted in a first transmission type and the second contents are transmitted in a second transmission type.

* * * * *